UNITED STATES PATENT OFFICE.

ISTVÁN BUGARSZKY, OF BUDAPEST, AUSTRIA-HUNGARY, ASSIGNOR OF ONE-THIRD TO LAJOS TOROK, OF BUDAPEST, AUSTRIA-HUNGARY, AND ONE-THIRD TO DR. KERESZTY, DR. WOLF ÉS TSA VEGYÉSZETI GYÁR, R. T., OF UJPEST, AUSTRIA-HUNGARY, A CORPORATION OF HUNGARY.

MANUFACTURE OF A LIGHT-COLORED TAR COLLOID HAVING CURATIVE PROPERTIES.

1,160,992.     Specification of Letters Patent.     Patented Nov. 16, 1915.

No Drawing.     Application filed December 17, 1912. Serial No. 737,216.

*To all whom it may concern:*

Be it known that I, Dr. ISTVÁN BUGARSZKY, a subject of the King of Hungary, residing at Budapest, Austria-Hungary, have invented new and useful Improvements in the Manufacture of a Light-Colored Tar Colloid Having Curative Properties, of which the following is a specification.

The preparation oil of cade mentioned as being officially approved in the *materia medica* books of Hungary and many other countries, could be more extensively used in dermal therapeutics than is at present the case if it did not contain certain constituents which impart to the preparation an irritating action on the skin and an unpleasant penetrating odor. Moreover the preparation has a dark brown color, which circumstance is objectionable when it is used as a cosmetic.

After long experiments I have succeeded in discovering a process, by means of which the undesirable constituents can be removed from the oil of cade without the constituents which have curative power thereby suffering any chemical change.

The process consists in that the oil of cade is subjected to fractional distillation in a vacuum at a pressure of or near to 20 mm. The first fraction begins to boil at about 50° C. When the boiling point 220° C. is reached, the distillation is interrupted, after which (likewise distillating in a vacuum) the second fraction boiling between 220° C. and 300° C. is taken; when the temperature of 300° C. is reached, the distillation is regarded as complete. This fraction distilling in a vacuum between 220° C. and 300° C. contains the constituents having curative properties free from the unpleasant secondary constituents of the original substance. The product so obtained (*i. e.* the said second fraction), which forms about one-third of the original substance, is a yellow colloid preparation with a slightly green fluorescence and great viscosity, which is soluble without residue in alcohol, chloroform and bisulfid of carbon; its odor is peculiarly pleasant and is not penetrating; and it does not cause the skin to crack. This product has a much higher density (1.053) than the fraction obtained from oil of cade between 150–175° at a pressure of 3 mm. (1.020). It is in a half liquid state, like honey, while the fraction obtained between 150–175° at 3 mm. is an easily flowing liquid, like naphtha. The distillation under a vacuum preferably takes place at a pressure of 20 mm.

What I claim is:

A process for the production of a light-colored product having curative properties from oil of cade, consisting in that oil of cade is subjected to fractional distillation in a vacuum at a pressure of or near to 20 mm. and the fraction taken between the temperatures of 220° C. and 300° C.

DR. ISTVÁN BUGARSZKY.

Witnesses:
    CHAS. MESSINGER,
    EUGENE HARSANYI.

Copies of this patent may be obtained for five cents each, by addressing the "Commissioner of Patents, Washington, D. C."